United States Patent [19]
Ashe et al.

[11] Patent Number: 4,858,050
[45] Date of Patent: Aug. 15, 1989

[54] STRUCTURALLY RIGID DISK CARTRIDGE ADAPTABLE TO ELIMINATING RELATIVE AXIAL CARTRIDGE AND/OR TRANSDUCER HEAD LOADING/UNLOADING MOVEMENT

[75] Inventors: Philip R. Ashe, Hilton; James R. Carey, Rochester, both of N.Y.; Patrick J. Champagne, Cupertino, Calif.; David L. Rowden, Rochester, N.Y.

[73] Assignee: Verbatim Corp., Sunnyvale, Calif.

[21] Appl. No.: 59,999

[22] Filed: Jun. 9, 1987

[51] Int. Cl.⁴ .............................................. G11B 23/03
[52] U.S. Cl. .................................. 360/133; 369/77.2; 369/291
[58] Field of Search ................ 360/133; 369/261, 291, 369/272, 77.2; 206/312, 444

[56] References Cited

U.S. PATENT DOCUMENTS

| | | | |
|---|---|---|---|
| 4,433,410 | 2/1984 | Siryj et al. | 206/312 X |
| 4,443,874 | 4/1984 | Steenberg | 369/291 |
| 4,622,607 | 11/1986 | Smith, II | 360/97 |
| 4,648,001 | 3/1987 | Komatsu et al. | 360/133 |
| 4,652,951 | 3/1987 | Kirn | 360/106 |
| 4,682,322 | 7/1987 | Ohta | 360/133 X |
| 4,688,206 | 8/1987 | Nakagawa et al. | 360/133 X |
| 4,740,948 | 4/1988 | Nakamori et al. | 360/133 X |

FOREIGN PATENT DOCUMENTS

| | | |
|---|---|---|
| 0174641 | 3/1986 | European Pat. Off. . |
| 0201885 | 11/1986 | European Pat. Off. . |
| 0202660 | 11/1986 | European Pat. Off. . |
| 0255185 | 2/1988 | European Pat. Off. . |
| 0045186 | 3/1980 | Japan ................................ 360/133 |
| 0113466 | 7/1982 | Japan . |
| 0224170 | 11/1985 | Japan ................................ 369/77.2 |
| 2161642 | 1/1986 | United Kingdom . |

*Primary Examiner*—Robert S. Tupper
*Assistant Examiner*—Andrew L. Sniezek
*Attorney, Agent, or Firm*—Dennis P. Monteith

[57] ABSTRACT

A cartridge comprises a rigid peripheral wall sandwiched between a pair of similarly rigid major surfaces, to form a compartment containing a disk arranged for rotation about a central axis. The cartridge obviates the need to have relative axial movement between the disk and a record/playback transducer head as the cartridge is loaded into a drive mechanism. To that end, a brake mechanism latches the disk axially, as well as radially, in its operative plane as the cartridge is loaded; additionally, the cartridge exposes the disk sufficiently to provide interference-free access to it by the transducer head. For that purpose, at least one of the major surfaces has a head-access opening extending to the peripheral wall, which, in turn, defines a relatively narrow bridge-like member, comparable in width to the operative plane of the disk, extending laterally, in the disk plane, from one side to the other side of the head-access opening. The bridge-like member, in addition to simplifying loading movement, maintains cartridge rigidity across the "throat" of the head-access opening.

4 Claims, 3 Drawing Sheets

STRUCTURALLY RIGID DISK CARTRIDGE ADAPTABLE TO ELIMINATING RELATIVE AXIAL CARTRIDGE AND/OR TRANSDUCER HEAD LOADING/UNLOADING MOVEMENT

CROSS-REFERENCE TO RELATED APPLICATIONS

Reference is hereby made to:

(1) U.S. patent application Ser. No. 925,432, entitled DISK CASSETTE LOADING/UNLOADING MECHANISM FOR USE IN A DISK RECORDER OR THE LIKE by J. D. Harney and R. G. C. Hills, filed on Oct. 31, 1986 now U.S. Pat. No. 4,755,894;

(2) U.S. patent application Ser. No. 799,511, entitled RECORD DISK ASSEMBLY by R. Covington and C. Harris, filed on Nov. 19, 1985 now abandoned; and (3) U.S. patent application Ser. No. 060,581, entitled DISK CARTRIDGE by P. R. Ashe, et al, filed on June 9, 1987.

FIELD OF THE INVENTION

The present invention relates to a cartridge for an information-bearing disk. The disk may be magneto-optical (Kerr or Faraday), magnetic, optical, or an equivalent thereof.

DESCRIPTION RELATIVE TO THE PRIOR ART

Commonly, a cartridge for an information-bearing disk is fabricated by attaching a pair of plastic half shells of substantially the same configurations together by machine screws or the like. The disk remains permanently within the resulting enclosure defined by a surrounding peripheral wall sandwiched between a spaced pair of major walls on opposing circular sides of the disk.

Although disk cartridges known in the art are generally protective of the enclosed disk and operate in their intended manner, applicants have noted that they suffer from one or more shortcomings in their respective designs. Specifically, in each cartridge, one or both major walls have an opening for gaining access to the enclosure by a cooperating transducer head for recording data on, or playing back data from, the disk. Whatever the data recording surface—magneto-optical, magnetic, or optical—it is important to maintain a tightly controlled axial spacing between the recording surface of the disk and the transducer head, to provide a sufficiently strong signal-to-noise ratio both in a recording mode and in a playback mode. Because of cartridge structure commonly enclosing the disk, however, a cooperating disk drive mechanism is required to provide a complicated loading arrangement suitable for carrying the cartridge (or the transducer head) in each of two orthogonal directions—laterally to align the head-access opening with the transducer head and axially to provide the appropriate head-to-disk spacing. It would simplify the drive mechanism, and thereby reduce cost of manufacture and improve reliability, and facilitate a reduction in form factor if the cartridge design permitted a loading arrangement limited to planar movement, preferably laterally, for properly positioning the recording surface of the disk and the transducer head relative to each.

U.S. Pat. Nos. 4,443,874 and 4,622,607 disclose a disk cartridge which has a U-shaped head-access opening comprising an elongate opening in each major cartridge wall extending to an opening in a peripheral cartridge wall. With this arrangement, each cartridge, although neither explicitly nor implicitly disclosed, would appear to provide an opportunity for eliminating axial cartridge loading movement because the proper head-to-disk spacing might be achieved merely by loading the cartridge laterally relative to the operative tip of a transducer head. Each cartridge suffers from a disadvantage, however, in that a U-shaped head-access opening, while appearing to expose a disk sufficiently to eliminate axial loading movement, weakens the cartridge peripherally across the "throat" of the head-access opening.

SUMMARY OF THE INVENTION

In view of the foregoing, it is an object of the invention to provide for an information-bearing disk, a structurally rigid cartridge which obviates the need to have relative axial movement between the cartridge and a record/playback transducer head as the cartridge is loaded into a drive mechanism. This object is achieved by means of at least one major cartridge surface having a head-access opening extending to a peripheral cartridge wall which, in turn, defines a relatively narrow bridge-like member, comparable in width to the operative plane of the disk, extending laterally, in the plane of the disk, from one side to the other side of the head-access opening to provide a unitary peripheral wall surrounding the disk. This arrangement strengthens the cartridge peripherally while providing to a transducer head ingress and egress to a head-access opening which obviate the need to have relative axial movement between the disk and the transducer head as the cartridge is loaded into and unloaded from, respectively, a drive mechanism.

The cartridge also includes a brake mechanism which latches the disk in its operative plane during loading movement, to further facilitate loading which obviates axial movement.

These and other advantages of the invention will become more apparent in the detailed description of the preferred embodiment presented below.

DESCRIPTION OF THE DRAWINGS

In the detailed description of a preferred embodiment of the invention presented below, reference is made to the accompanying drawings, in which.

DETAILED DESCRIPTION OF A PREFERRED EMBODIMENT

Figure 1:
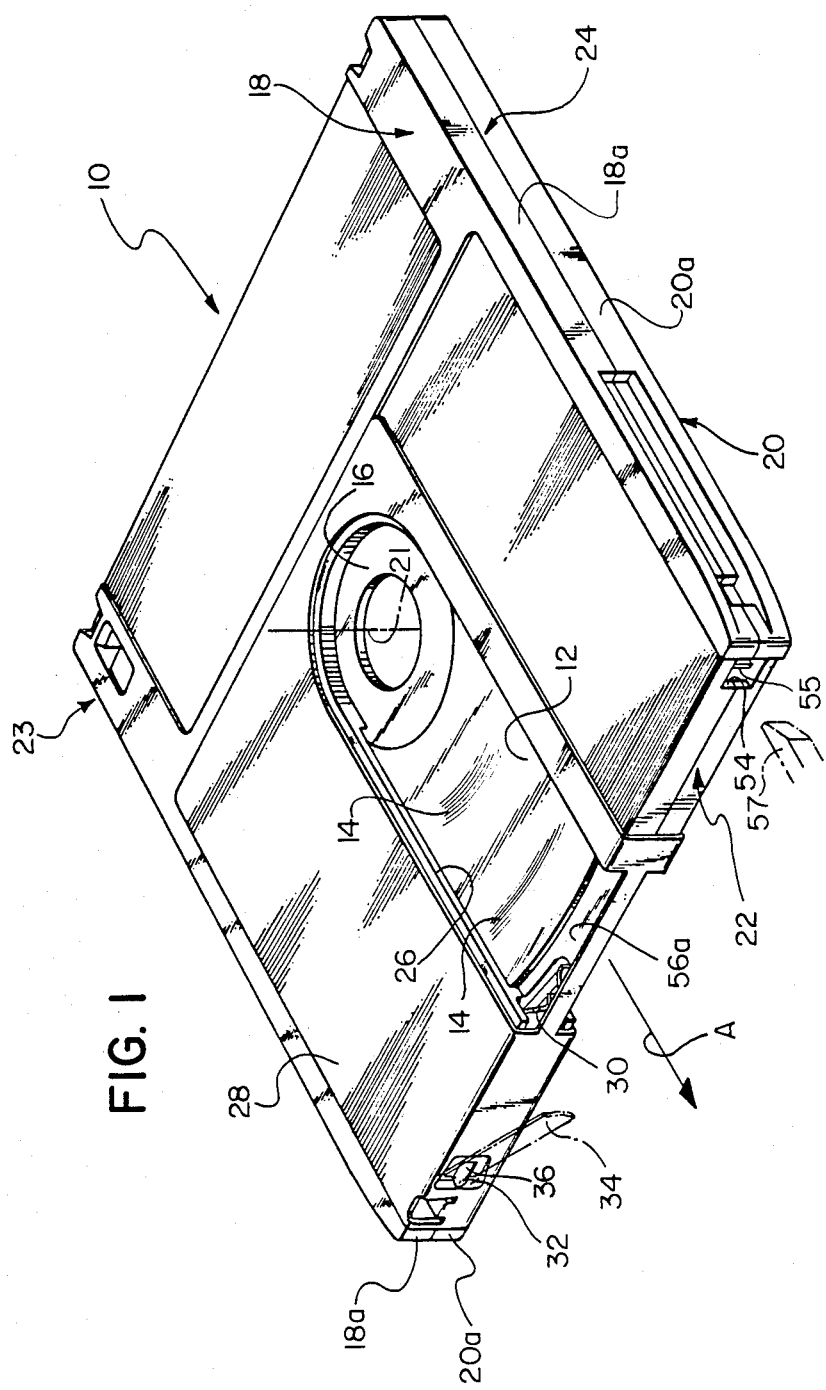
FIG. 1 is a top perspective view of a disk cartridge, in accordance with the invention, with a cartridge shutter mechanism in an open disk-uncovering position.

FIG. 1 illustrates a presently preferred embodiment of a cartridge 10, in accordance with the invention, containing a disk 12 adapted for recording data on, and playing back data from, a plurality of concentric record tracks 14 encircling a central spindle-drive region 16 of the disk. Preferably, the recording surface of the disk 12 is magneto-optical, although various alternative surfaces, such as strictly magnetic or exclusively optical, may also be used. It should be recognized that both single- and double-sided recording may be employed, and that when double-sided recording is used, as is preferred for large-capacity data storage, both circular sides of the disk 12 include a recording surface. It should further be recognized that the disk 12 may also include one or more layers of suitable composition serving to support its recording surface and/or protect it from environmental effects.

The cartridge 10 comprises a top plate 18 and a bottom plate 20, as viewed in FIG. 1, composed of a material to provide structural rigidity. Preferably, both plates 18, 20 are plastic and are formed by a commercially available injection molding operation.

The top plate 18 and the bottom plate 20 are generally of a size to accommodate a disk of standard size—3 ½-, 4¾(compact disk)-, 5 ¼-, 8-inch or the like—to permit rotatable movement of the disk 12 therebetween about a central axis of rotation 21. To that end, each plate 18, 20 has an integral peripheral lip 18a, 20a, respectively, cooperatively forming a surrounding peripheral wall 22 which serves to space the lower surface of the top plate 18 from the upper surface of the bottom plate 20. Thus, the peripheral wall 22 together with the top plate 18 and the bottom plate 20 define the outer dimensions of a generally enclosed rigid compartment in which the disk 12 is contained for rotatable movement. A write protection device, indicated generally by reference numeral 23, is located near a corner of the cartridge where it does not interfere with the disk 12.

With magneto-optical technology, a complementary disk drive mechanism may advantageously divide its record/playback transducer head into two separate portions arranged, respectively, to be on opposing circular sides of a disk loaded therein. This may be done for a variety of reasons such as the magneto-optic effect employed (Faraday versus Kerr), design flexibility provided by separating a magnetic field coil from optical apparatus, economies in packaging, etc.

A presently preferred embodiment of the cartridge 10 provides an aligned pair of elongate head-access openings 26 which provide, to a "split" transducer head, operational access to the record tracks 14 of the disk 12 when the cartridge is operatively loaded in a disk drive mechanism. In the case of a recording surface—magneto-optical, magnetic, or optical—on each side of the disk 12, the cartridge 10 also has, of course, a head-access opening 26 on each side. It should be recognized, however, that a single head-access opening would preferably be provided for single-sided recording by a transducer head totally confined to the recording side of the disk.

When the cartridge 10 is removed from a drive mechanism, a spring-biased generally U-shaped shutter 28 serves for automatically covering each head-access opening 26, to protect the disk 12 from adverse external effects such as dirt, lint, fingerprints, and the like. For that purpose, the shutter 28 is mounted (by means not shown) for slidable movement along a portion 29 (FIG. 2) of the front peripheral wall 22 between a first extreme position, as shown by the solid lines of FIG. 1, in which each head-access opening 26 is uncovered, and a second extreme position in which each head-access opening is covered. A resilient finger member 30, by means of engaging the inwardly facing side of a ramped surface 32, latches the shutter 28 in its covering position.

A pivotally mounted shutter actuator 34 of a disk drive mechanism, shown in phantom, serves a dual function of (1) unlatching the shutter 28, and (2) moving the shutter from its covering to its uncovering position, as the cartridge 12 is inserted in the direction of the arrow A into the drive mechanism. For those purposes, the shutter actuator 34, which engages the outside of the ramped surface 32, unlatches the shutter 28, by means of engaging the finger member 30 through an aperture 36, when the cartridge 10 is initially inserted into the drive mechanism; the actuator 34 then pivots while retreating in response to planar movement of the cartridge 10 in the direction of arrow A toward its final seated position in the drive mechanism. This pivoting movement abuttingly urges the shutter 28 into its uncovering position.

A return spring 38 (FIG. 2) serves for moving the shutter 28 automatically to its covering position when the cartridge 10 is ejected from the drive mechanism.

The object of the invention requires the eliminating of axial movement between a disk cartridge and a record/playback transducer as the disk is loaded into a drive mechanism. To that end, each head-access opening 26 extends outwardly from a central portion to the front peripheral wall 22 of the cartridge. Further to that end, the front peripheral wall of the cartridge is "narrowed" to provide a bridge-like member, comparable in width to the plane of the disk, extending laterally, in the disk plane, from one side to the other side of each head-access opening. By eliminating or limiting external cartridge structure, the disk 12 is selectively exposed so that its recording surface may be positioned immediately adjacent the operative tip of the transducer head, solely by means of lateral cartridge loading movement.

The object of the invention further requires that structural rigidity is maintained throughout the disk cartridge. For that purpose, which conflicts somewhat with the object of obviating the need for relative axial loading movement, the bridge-like member includes internal cartridge structure, integral with the front peripheral wall, to provide a unitary structure extending laterally across the front of the cartridge. By providing integrated, unitary structure linking the front wall of the cartridge peripherally across the "throat" of each head-access opening, the rigidity of the cartridge is maintained.

Figure 2:
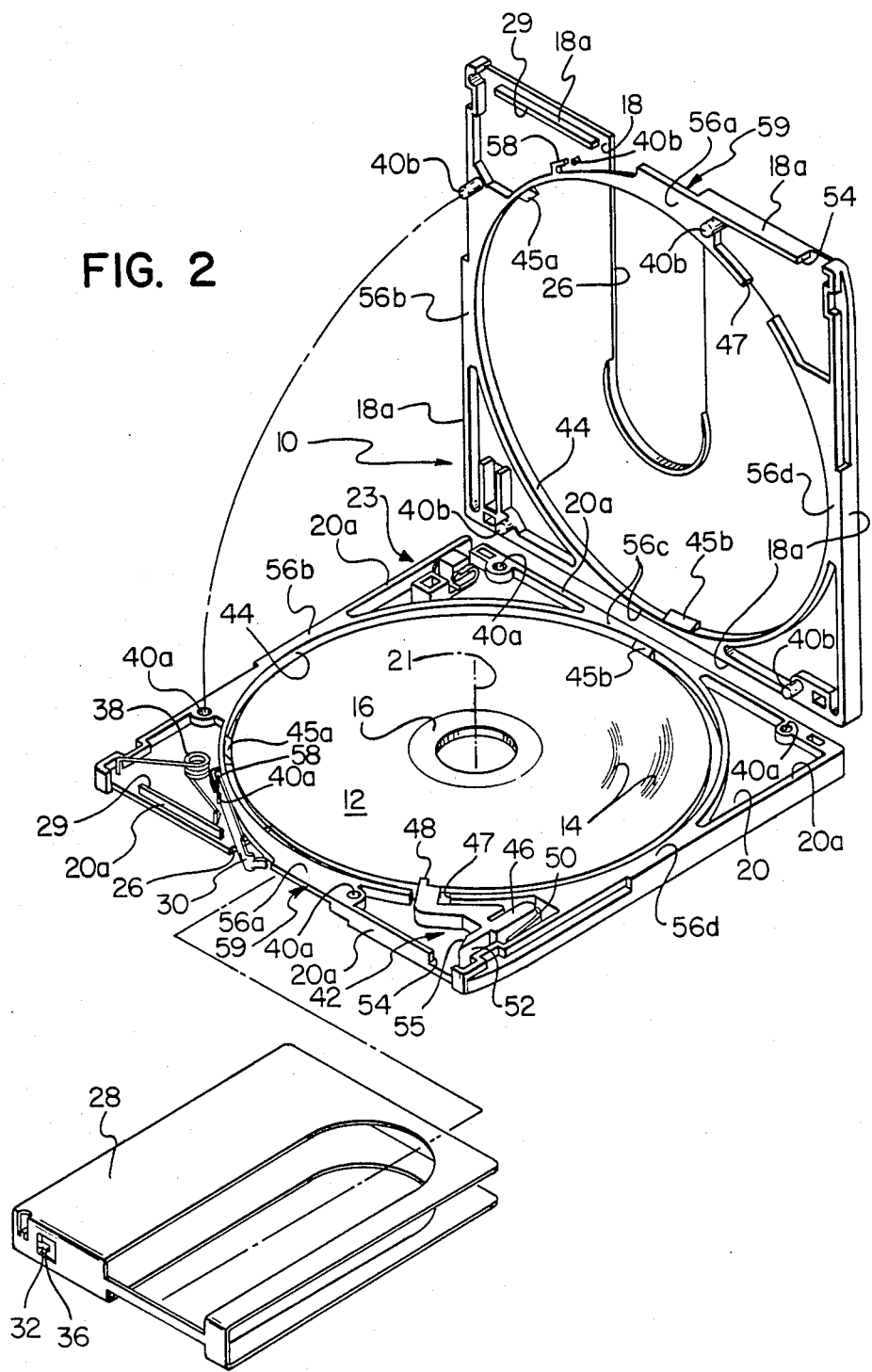
FIG. 2 is a clam-shaped view showing the interior of the cartridge of FIG. 1.

The predominantly clam-shaped view of FIG. 2 more clearly illustrates features of the cartridge 10 in accordance with the invention. The top surface of the bottom plate 20 has a topography which is substantially a mirror image of the topography of the bottom surface of the top plate 18, when the two plates are arranged as shown. A difference between the two surfaces is the bottom plate 20 has a series of circular holes and slots 40a which receive corresponding locating pins 40b of the top plate 18 for the purpose of aligning the two plates with each other. The locating pins and the corresponding receiving holes may be interchanged, of course, either in total or in selected sub-combinations.

A brake mechanism 42 serves to facilitate cartridge-loading which obviates axial movement. To that end, the brake mechanism 42 serves for clamping the disk 12 axially, as well as radially, in its operative plane until the cartridge 10 is inserted fully into a drive mechanism. The term "operative plane" as used herein shall mean and refer to the plane actually occupied by the disk during a recording/playback operation and/or any head-to-disk spacing in the axial direction.

This clamping, particularly in the axial direction, serves to facilitate the loading of the disk 12 without axial cartridge movement; it also functions to protect the disk against damage from abrasion, cracking and the like, by eliminating rattling when the cartridge is jostled during transporting or in handling.

For the purpose of clamping the disk 12, each one of the plates 18, 20 has a circular generally centrally aligned fence 44. The diameter of each fence 44 is slightly larger than the diameter of the disk 12. Thus, when the top plate 18 and the bottom plate 20 are brought together, the two fences 44, which are integral with their respective plates, cooperatively encircle the disk 12.

Two pairs of corresponding ramp-like projections 45a, 45b, on the concave (inwardly facing) side of each fence 44, cooperatively form a spaced pair of V-shaped nooks centered at the interface common to the two fences, the operative plane of the disk 12.

A spring-biased pivotally mounted brake member 46 serves to actually clamp to disk 12 within each nook. For that purpose, each fence 44 has a small arcuate opening 47 through which a nose 48 of the brake member 46 protrudes under the influence of its bias spring 50. The disk-engaging surface of the nose 48, like the cooperating projections 45, forms a V-shaped nook.

Figure 3:
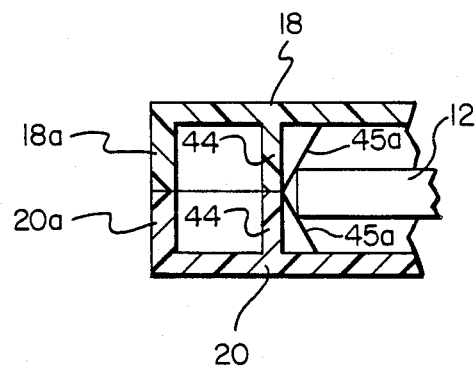
FIG. 3 is a cross-sectional view of a portion of the interior of the cartridge showing the disk clamped axially and radially in its operative plane.

In its spring-biased position, the nose 48 abuttingly engages a circumferential edge of the disk 12 and thereby urges the opposing edge of the disk into the vertex of each V-shaped nook. In that position, the disk 12, under the guiding action of each of V-shaped nook and the nose 48, is clamped not only radially against the base of each nook, as shown in FIG. 3, but is suspended axially, centered substantially in its operative plane, between the lower surface of the top plate 18 and the top surface of the bottom plate 20. Although at least two V-shaped nooks, in addition to the nose 48, are required for clamping, we have found that the location of each nook is not particularly important, as long as they are properly spaced for supporting the disk.

Referring back to FIG. 2, an integral finger 52 serves for releasing the brake member 46 when the cartridge 10 is fully inserted into a drive mechanism. To that end, the finger 52 is accessible through an aperture 54 in a corner of the front peripheral wall 22. A fixed reference member 57 (FIG. 1), such as a post, pin or the like, of a disk drive mechanism, engages a cam surface 55 of the finger 52 and thereby pivots the brake member 46, against the influence of the spring 50. This releases the brake mechanism 42 which permits axial and radial clearance inside the enclosure for rotating the disk 12 in response to a drive-spindle (not shown).

An L-shaped projection 58, on the convex side of each fence 44, serves for cooperatively forming a narrow open-ended receiving chamber for mounting the finger member 30.

FIG. 2 further shows that each fence 44 is substantially tangent to the four sides of the corresponding peripheral lip 18a, 20a. Lands 56a through 56d, located adjacent respective points of tangency and provided conveniently by an injection molding operation, serve to further integrate each fence 44 with its corresponding plate, to enhance the overall structural rigidity of the cartridge 10.

Lands 56a are of particular importance insofar as the teachings of the present invention are concerned. Each land 56a serves, in cooperation with the corresponding front peripheral wall 22, to provide the aforementioned relatively narrow bridge-like member linking the front peripheral wall, in the plane of the disk 12, laterally from one side to the other side of the head-access opening 26.

Figure 4:
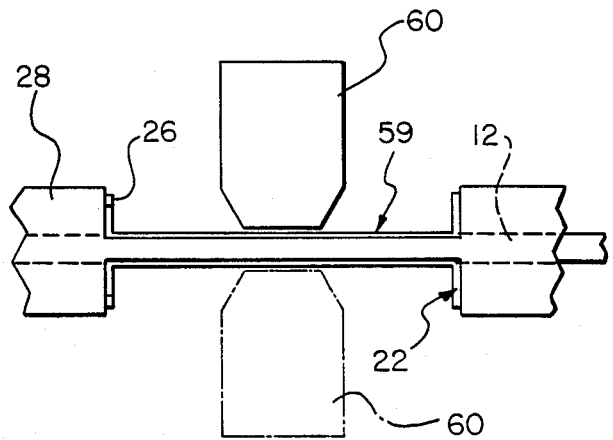
FIG. 4 is a front elevation view showing the cartridge loaded in a drive mechanism.

FIG. 4 illustrates that the "bridge" denoted 59, is comparable in width to the plane of the disk 12. To obviate axial loading movement, the width of the bridge 59 is required to be no wider than the operative plane of the disk 12—the actual thickness of the disk, in the axial direction, plus any clearance between the recording/playback transducer head, denoted 60, and the disk. Preferably, the bridge is as wide as possible to strengthen the rigidity of the cartridge 10 peripherally. At the same time, the widest possible bridge improves manufacturing yield when liquid plastic is injected at a pressure acceptable for a commercial-grade molding operation.

ADVANTAGEOUS TECHNICAL EFFECT

In view of the foregoing, a cartridge exposes an enclosed disk so that its recording surface may be operatively positioned adjacent a transducer head, solely by means of planar cartridge loading movement. To that end, a major surface of the cartridge has a head-access opening extending to a peripheral cartridge wall which defines a bridge-like member, comparable in width to an enclosed disk and extending laterally from one side to the other side of the head-access opening. The bridge-like member, in addition to simplifying cartridge-loading movement, maintains cartridge rigidity peripherally, across the "throat" of the head-access opening.

A further cartridge feature includes a brake mechanism, which latches the disk in its operative plane, to facilitate loading which obviates axial movement.

The invention has been described in detail with reference to the figures, however, it will be appreciated that variations and modifications are possible within the spirit and scope of the invention. Patentable features disclosed but not claimed herein are disclosed and claimed in either U.S. patent application Ser. No. 060,000, entitled A DISK BRAKE MECHANISM FOR A DISK CARTRIDGE by D. Rowden et al, now U.S. Pat. No. 4,785,370, patent application Ser. No. 059,996, entitled A SHUTTER LATCH MECHANISM FOR A DISK CARTRIDGE by D. Rowden et al. now U.S. Pat. No. 4,779,159 or the aforecited U.S. patent application Ser. No. 060,581, entitled DISK CARTRIDGE, which are assigned to the assignee of the present invention.

What is claimed is:

1. In a cartridge comprising an aligned pair of substantially rigid first and second plates spaced from each other to enable a disk disposed therebetween to rotate about a central axis for recording data on, and playing back data from, a plurality of record tracks encircling the rotational axis of the disk, the improvement comprising:
   (a) each of said first and second plates including an elongate head-access opening extending outwardly from a centrally disposed area exposing a spindle-drive region of the disk to a common forwardly facing peripheral edge of said cartridge, to jointly expose an entire radial section of each side of the enclosed disk to a record and/or playback transducer head when the disk is rotated after said cartridge is operatively loaded into a disk drive mechanism; and
   (b) first and second rigid relatively thin reinforcement structures integrally formed, respectively, with said first plate and said second plate by means of each of said reinforcement structures having first and second ends integrally connected to its associated plate on respectively opposing sides of the head-access opening, to provide a monolithic cartridge structure extending from one side to the other side of each head-access opening, each of said reinforcement structures further lying axially adjacent each other in the operative plane of the enclosed disk toward an outlying end of each head-access opening adjacent the peripheral edge, to cooperatively define a relatively narrow bridge-like member which (i) in the axial direction is no wider than the corresponding axial dimension of the operative plane of the disk enclosed, (ii) is integrally connected with each plate on both sides of each head-access opening, and (iii) extends laterally in the plane of the disk generally along the forwardly facing peripheral edge of said cartridge from one side to the other side of each head-access opening, to jointly maintain cartridge rigidity peripherally across the outlying end of each head-access opening while providing to a record and/or playback transducer head of a drive mechanism operative access to the record tracks of the disk through the outlying end of either head-access opening without the need to have relative movement in the axial direction between said cartridge and the record and/or playback transducer head as said cartridge is loaded into or unloaded from a drive mechanism.

2. A cartridge as defined in claim 1 further including a generally U-shaped shutter straddling said cartridge for slidable movement, relative to each head-access opening, along said forwardly facing peripheral edge of said cartridge between (1) an open disk-uncovering position when said cartridge is operatively loaded into a disk drive mechanism, and (2) a normally closed disk-covering position when said cartridge is removed from a drive mechanism, at least a portion of said U-shaped shutter being no wider in the axial direction than the operative plane of the enclosed disk for permitting said shutter to cooperate with said bridge-like member to jointly provide to a record and/or playback transducer head operative access to the record tracks of the disk through the outlying end of either head-access opening when said shutter is in said open disk-uncovering position.

3. A cartridge as defined in claim 1 further including a brake mechanism for latching the disk axially in its operative plane during cartridge loading movement.

4. A cartridge as defined in claim 3 wherein said brake mechanism includes means for latching the disk axially and radially in its operative plane during cartridge loading movement.

* * * * *